Patented June 7, 1949

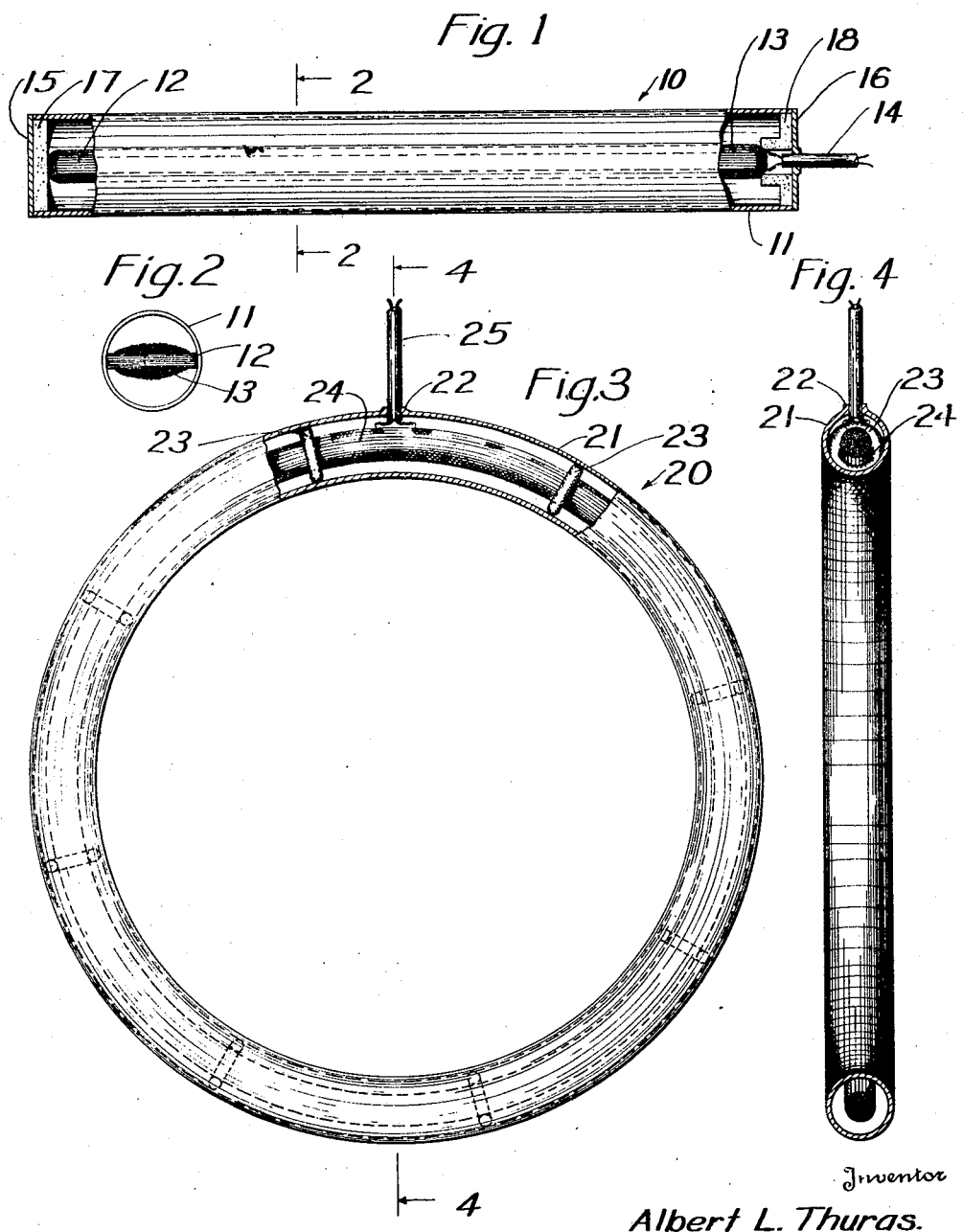

2,472,388

UNITED STATES PATENT OFFICE 2,472,388

MAGNETOSTRICTIVE OSCILLATOR

Albert L. Thuras, New London, Conn., assignor to the United States of America as represented by the Secretary of the Navy Application January 15, 1944, Serial No. 518,447

2 Claims. (Cl. 177—386)

This invention relates to a device for converting or translating compressional wave energy into electrical energy or vice versa. It has particular application to the production and reception of such compressional wave energy of supersonic frequency for use in connection with underwater signalling systems.

Many types of magnetostrictive oscillators for use in underwater signalling systems have already been developed prior to this invention. However, in so far as known, most of these are of the type in which a great number of comparatively small tubes of magnetostrictive material are fixed to a diaphragm. Around each of the tubes is wound a coil.

When the oscillator is used for sending compressional wave energy, the coils are energized from a current source which alternates at supersonic frequency. The resulting alternations of the magnetic field in the coils causes the tubes to alternately expand and contract lengthwise at the same frequency of the alternations of the magnetic field thus causing the diaphragm to similarly oscillate. The face of the diaphragm is in acoustic contact with the water and hence compressional wave energy is transmitted therethrough to a suitable receiver.

When the oscillator is used as receiver, compressional wave energy of supersonic frequency striking the diaphragm causes the tubes (which are polarized with a magnetic field) to alternately expand and contract, thus changing the flux linkages between this field and its associated coil to induce an electromotive force in the coil which is then fed into suitable detecting means.

However, prior to this invention, no types were known in which the magnetostrictive oscillator structure comprised but a single and comparatively larger size tube of magnetostrictive material which could be placed in direct surface contact with the water, no diaphragm member therefore being required; and in which the coil for producing the magnetic field was disposed entirely within the tube and suitably sealed to prevent water from entering therein.

The general object of this invention therefore is to provide a magnetostrictive oscillator comprising a tube of magnetostrictive material which contains a coil entirely therein and which can be placed in direct contact with the transmitting medium in which it is located.

Another object of the invention is to provide a device of the character described comprising a straight tube of magnetostrictive material having a coil wound therein, the conductors of which lie parallel with the longitudinal axis of the tube whereby the tube may be caused to alternately expand and contract radially. When this type is used for sending compressional wave energy, the intensity pattern of such energy is substantially uniform in a plane normal to the longitudinal axis of the tube. When used as a receiver, this type is most sensitive to compressional wave energy striking the tube in a direction normal to the longitudinal axis of the tube.

A further object of the invention is to provide a magnetostrictive oscillator comprising a tube of magnetostrictive material shaped in the form of a toroid. When this type is used for sending, most of the compressional wave energy is emitted in a beam which is normal to the axis of the toroid. When used as a receiver, this type is most sensitive to energy striking normal to the toroidal axis.

These and other objects of the invention will become apparent from the following detailed description and from the accompanying drawings which show two embodiments of the invention.

In the drawings:

Fig. 1 is a side elevation partly in section of a magnetostrictive oscillator having a straight tubular form;

Fig. 2 is a cross section through Fig. 1 as indicated by the lines 2—2 thereon;

Fig. 3 is a side elevation partly in section of an oscillator in toroid form embodying the invention; and Fig. 4 is a cross section through Fig. 3 as indicated by the lines 4—4 thereon.

Referring now to Figs. 1 and 2, the straight tubular type of oscillator is generally designated at 10 and comprises a comparatively thin walled nickel tube 11 which possesses magnetostrictive properties. Inside of the tube 11 is a core 12 of laminated material such as transformer iron which possesses a comparatively high permeability. This core which extends lengthwise of the tube and is generally coincident with its longitudinal axis is preferably made slightly greater in width than the internal diameter of tube 11, thus making a press fit with the tube wall upon insertion.

The coil in which an electromotive force is induced when the device is used for receiving compressional wave energy or upon which an alternating current of supersonic frequency is impressed when the device is used for transmitting compressional wave energy is indicated at 13. This coil consists of a number of turns of wire wound lengthwise about the core in the manner shown in Figs. 1 and 2. The number of turns provided is governed by the desired alternating current impedance of the unit. Such impedance is approximately proportional to the square of the number of turns. A transformer (not shown) may be used to step up the impedance of the oscillator to correspond with the input of an amplifier associated therewith when the device is used for receiving compressional wave energy.

To seal the ends of the oscillator, end plate members 15 and 16 made of suitable material are provided. Plate 16 includes a central opening therethrough for receiving cable 14, this opening then being sealed by any suitable means. To insure that the core and coil wound thereon are completely protected from physical shock two resilient cushioning members 17 and 18 may be provided. The latter member includes a central opening therethrough for accommodating cable 14 and the leads to the coil 13.

A second embodiment of the invention is illustrated in Figs. 3 and 4. In this embodiment, the magnetostrictive oscillator 20 comprises an annular tube which is shaped in the form of a ring or toroid as shown at 21. The tube is provided with a small opening 22 through which the leads into the coil are passed. This coil indicated at 24 consists of a number of turns wound inside the tube as shown in Fig. 3. In order to space coil 24 centrally within tube 21, a plurality of spacer members 23 of insulating material preferably resilient are provided through which the coil is passed.

In this particular embodiment, no core is provided. The leads to coil 24 are connected to a cable 25 which passes through an opening 22 in the tube. This opening is then sealed in any suitable manner to prevent water from entering the interior of tube 21. Fig. 3 shows the tube 21 and coil 24 in completed form. A preferred way to make the device is to form the tube 21 into an approximately closed circle. The conductor which makes up coil 24 is then wound into the tube until the desired number of turns has been obtained after which the spacer members 23 are wrapped, one at a time, around the turns and then pushed into the tube. The tube is then closed and soldered to make a closed annular seam adjacent opening 22. In order to support the weight of the coil and tube at the opening 22 independently of the cable 25, a shackle (not shown) may be provided. The shackle may in turn be supported by a member (also not shown) secured to the vessel on which the unit is carried.

In both forms of the invention which have been described, the dimensions of the nickel tube are of importance because of the effect on the electrical behavior of the oscillator. The diameter of the tube controls the resonance of the device, which resonance varies inversely as the tube diameter.

In order to cut down eddy current loss, the thickness of the tube wall should be reduced to a minimum value. However, the wall thickness should not be reduced to such a dimension that its ability to withstand physical distortion is impaired. In the modification shown in Fig. 1, it has been found that a wall thickness of approximately .035 inch is satisfactory with a tube diameter of 2 inches, while in the embodiment shown in Fig. 3, a wall thickness of .065 inch has been found satisfactory with a tube diameter of 2 inches.

As explained in the first part of this specification, the magnetostrictive tube is polarized with a magnetic field. This magnetic field may be produced by passing a fairly heavy direct current through the coil. One way of accomplishing this is to discharge a condenser of sufficient capacity to provide a critically damped surge of direct current through the coil. This should be repeated periodically in order that the output of the unit will be maintained at a maximum level. It has been found that the nickel tube will maintain its magnetism best when the nickel has been hardened as by cold working during the forming operations.

An alternate method of premagnetizing the nickel tube would be to impress direct current upon the coil.

When the straight oscillator structure shown in Fig. 1 is used as a receiver, compressional wave energy from a remote source striking the surface of the tube normal to the tube's longitudinal axis induces therein in-phase voltages in the coil throughout the entire length of the tube. Compressional wave energy striking the tube at other angles than normal to this axis will create phase differences in the voltages induced throughout the length of the tube. This is due to the fact that the wave front does not then strike all portions along the tube's length at the same time. These phase differences tend to decrease the resultant output voltage from the oscillator when used as a receiver and thereby makes the same directive in a plane normal to the tube's longitudinal axis.

In the case of the toroid structure shown in Fig. 3, where the coil winding extends circumferentially in the tube, compressional wave energy striking the side of the toroid normal thereto (in the direction of the arrows) will produce a maximum output from the coil. Compressional wave energy striking the toroid at other angles will result in an output less than maximum. Hence, the toroidal oscillator is directive along the axis a—a' of the toroid.

In conclusion, it is to be understood that modifications may be made in the embodiments of the invention as described by those skilled in the art without departing from the spirit and scope of the invention as defined by the appended claims.

I claim:

1. A magnetostrictive oscillator for producing and receiving compressional wave energy comprising a toroidal tube of magnetrostrictive material, and a coil disposed within said tube, the conductors of which extend circumferentially in the tube and lie parallel with the tube wall.

2. A magnetostrictive oscillator for producing and receiving compressional wave energy comprising a toroidal tube of magnetostrictive material, a coil disposed within said tube the conductors of which extend circumferentially in the tube and lie parallel with the tube wall, and a plurality of insulators disposed between said coil and tube to thereby space the coil from the tube wall.

ALBERT L. THURAS.

REFERENCES CITED

The following references are of record in the file of this patent:

UNITED STATES PATENTS

| Number | Name | Date |
|---|---|---|
| 1,985,251 | Hayes | Dec. 25, 1934 |
| 2,063,944 | Pierce | Dec. 15, 1936 |
| 2,063,949 | Pierce | Dec. 15, 1936 |
| 2,249,835 | Lakatos | July 22, 1941 |